(12) United States Patent
Campbell

(10) Patent No.: US 12,339,119 B2
(45) Date of Patent: Jun. 24, 2025

(54) METHOD AND SYSTEM FOR AUTOMATING AND CONFIGURING AN AIRCRAFT DE-ICING PAD FACILITY

(71) Applicant: JCAI Inc., Mississauga (CA)

(72) Inventor: Jeffery Paul Campbell, Cambridge (CA)

(73) Assignee: JCAI Inc., Mississauga (CA)

( * ) Notice: Subject to any disclaimer, the term of this patent is extended or adjusted under 35 U.S.C. 154(b) by 0 days.

(21) Appl. No.: 16/282,825

(22) Filed: Feb. 22, 2019

(65) Prior Publication Data
US 2019/0257656 A1    Aug. 22, 2019

Related U.S. Application Data

(60) Provisional application No. 62/633,674, filed on Feb. 22, 2018.

(51) Int. Cl.
| | |
|---|---|
| G01C 21/00 | (2006.01) |
| B64F 1/00 | (2006.01) |
| B64F 5/23 | (2017.01) |
| B64F 5/20 | (2017.01) |

(52) U.S. Cl.
CPC .......... *G01C 21/005* (2013.01); *B64F 1/002* (2013.01); *B64F 5/23* (2017.01)

(58) Field of Classification Search
CPC ........ G01C 21/00; G01C 21/005; G08G 5/06; B64F 5/20; B64F 5/23; B64F 1/002; B60D 43/00
See application file for complete search history.

(56) References Cited

U.S. PATENT DOCUMENTS

| | | | | |
|---|---|---|---|---|
| 4,951,046 A | * | 8/1990 | Lambert | H05B 47/185 340/953 |
| 5,060,887 A | * | 10/1991 | Kean | B64F 5/20 244/134 C |
| 5,161,753 A | * | 11/1992 | Vice | B64F 5/20 244/134 C |
| 5,180,122 A | | 1/1993 | Christian et al. | |
| 5,597,140 A | * | 1/1997 | Madsen | B64F 5/27 244/134 R |
| 6,092,765 A | | 7/2000 | White | |

(Continued)

FOREIGN PATENT DOCUMENTS

| | | |
|---|---|---|
| CA | 1278979 C | 1/1991 |
| CA | 2056120 A1 | 5/1993 |

(Continued)

OTHER PUBLICATIONS

Canadian Intellectual Property Office as International Searching Authority, International Search Report for PCT/CA2019/050216, Apr. 11, 2019.

(Continued)

*Primary Examiner* — Tan Q Nguyen
(74) *Attorney, Agent, or Firm* — Gowling WLG (Canada) LLP

(57) ABSTRACT

A method and system for automating de-icing procedures for aircraft including the transmission of messages and illumination of guidance lights for pilots to direct their aircraft for de-icing. The system further includes apparatus for generating a safety zone to provide further protection of damage or injury to personnel or aircraft or de-icing machinery.

16 Claims, 22 Drawing Sheets

(56) References Cited

U.S. PATENT DOCUMENTS

| | | | |
|---|---|---|---|
| 6,354,714 B1* | 3/2002 | Rhodes | F21S 4/24 |
| | | | 362/153.1 |
| 6,636,581 B2 | 10/2003 | Sorenson | |
| 7,069,121 B1 | 6/2006 | Cummings, Jr. et al. | |
| 7,725,410 B2 | 5/2010 | Lee | |
| 8,571,747 B2 | 10/2013 | Zimpfer et al. | |
| 8,982,207 B2 | 3/2015 | Jang | |
| 9,031,311 B2 | 5/2015 | Tillotson | |
| 9,352,852 B2* | 5/2016 | Luca | B05B 12/04 |
| 9,805,611 B2 | 10/2017 | Campbell | |
| 9,828,115 B2 | 11/2017 | Campbell et al. | |
| 9,892,207 B2 | 2/2018 | Schmidt et al. | |
| 2003/0043964 A1 | 3/2003 | Sorenson | |
| 2004/0054550 A1 | 3/2004 | Cole et al. | |
| 2005/0078006 A1* | 4/2005 | Hutchins | G08B 13/2454 |
| | | | 340/561 |
| 2005/0082435 A1 | 4/2005 | Rasmussen et al. | |
| 2005/0090969 A1 | 4/2005 | Siok et al. | |
| 2007/0040064 A1 | 2/2007 | Lee | |
| 2007/0088492 A1* | 4/2007 | Bitar | G08G 5/006 |
| | | | 701/4 |
| 2008/0258010 A1 | 10/2008 | Leon et al. | |
| 2009/0150022 A1 | 6/2009 | McMillin et al. | |
| 2009/0323320 A1* | 12/2009 | Goodman | E01F 9/559 |
| | | | 362/153.1 |
| 2011/0098872 A1* | 4/2011 | Lewis | G08G 5/025 |
| | | | 701/16 |
| 2013/0073419 A1 | 3/2013 | Marwedel et al. | |
| 2013/0240655 A1 | 9/2013 | Isaiah et al. | |
| 2013/0342372 A1* | 12/2013 | Stauffer | F21V 13/02 |
| | | | 340/953 |
| 2014/0200748 A1 | 7/2014 | Porez et al. | |
| 2015/0081141 A1* | 3/2015 | Campbell | B64F 5/23 |
| | | | 701/3 |
| 2016/0075436 A1* | 3/2016 | Rossano | G06F 3/04847 |
| | | | 715/771 |

FOREIGN PATENT DOCUMENTS

| | | |
|---|---|---|
| CA | 2450981 A1 | 1/2003 |
| CA | 2782709 A1 | 7/2012 |
| CA | 2851849 A1 | 4/2013 |
| CA | 2863052 A1 | 3/2015 |
| CN | 101100222 A | 1/2008 |
| EP | 2848537 | 3/2015 |
| KR | 10-1179519 B1 | 7/2012 |
| KR | 20120075575 A | 7/2012 |
| KR | 101179519 | 8/2012 |
| WO | 2013053044 A1 | 4/2013 |

OTHER PUBLICATIONS

Canadian Intellectual Property Office as International Searching Authority, Written Opinion for PCT/CA2019/050216, Apr. 11, 2019.

Mitteldeutsche Airport Holding, "Aircraft De-icing at Leipzig/Halle Airport—Standard Deicing Setup", Aug. 21, 2012, downloaded May 7, 2015 from https://www.leipzig-halle-airport.de/mediapool/standard_deicing_setup_rev_04_vom_21-8-2012.pdf.

European Search Report dated Sep. 24, 2021 for European Application No. 19 75 7775.

Communication of a Notice of Opposition for the corresponding EP Application No. 20020631.6 dated Jul. 11, 2023.

Commission Regulation No. 29/2009 of Jan. 16, 2009 laying down requirements on data link services for the single European Sky.

Bolczak et al., Controller-Pilot Data Link Communications (CPDLC) Build 1 Value-Added Services, 2004, IEEE.

Siv.Ing. Haakon Wiig AS, "DECO Deicing Management System", Dec. 31, 1998, downloaded May 7, 2015 from http://www.deicing.info/Microsoft PowerPoint-DecoIntro.pdf.

Vestergaard Company A/S, "De-Icing System Data Transmission System—DTS", Mar. 27, 2009, downloaded May 7, 2015 from http://vestergaardcompany.com/vesterhjem/wp-content/uploads/2013/11/dts1.pdf Mäkelä, "Developing of Aircraft De-Icing Operations At Helsinki Airport", May 31, 2010, downloaded Jul. 7, 2015 from https://publications.theseus.fi/bitstream/handle/10024/16632/THESIS READY MIKKO MAKELA.pdf.

Mitteldeutsche Airport Holding, "Aircraft De-icing at Leipzig/Halle Airport—Standard Deicing Setup", Aug. 21, 2012, downloaded May 7, 2015 from https://www.leipzig-halle-airport.de/mediapool/standard_deicing_setup_rev_04_vom_21-08-2012.pdf.

RATT—Ground Handling International Feb. 2008, Passenger terminal Expo 2008 and Ground Handling International Oct. 2009.

When in Doubt.. Small and Large Aircraft, Aircraft Critical Surface Contamination Training, TP10643, Chapter 4.

International Civil Aviation Organization, Manual of Aircraft Ground De-icing/Anti-icing Operations, Second edition, 2000.

Steve Ritter, Aircraft Deicers, Jan. 1, 2001, vol. 79 No. 1, Chemical and Engineering News DU U.S. Pat. No. 5,180,122 (Christian), Jan. 19, 1993.

Cision PR Newswire, Saab Introduces Aerobahn De-icing Manager, retrieved from https://www.prnewswire.com/news-releases/saab-introduces-aerobahn-de-icing-manager-216427231.html, dated Jul. 22, 2013.

The Denver Post, Denver International Airport implements new surface management system, retrieved from https://www.denverpost.com/2012/09/28/denver-international-airport-implements-new-surface-management-system/, dated Dec. 18, 2023.

Airport Improvement, Philadelphia Int'l Tests Web-Based System for Managing Airfield Ops retrieved from https://airportimprovement.com/article/philadelphia-intl-tests-web-based-system-managingairfield-ops, dated Jul.-Aug. 2012.

Wayne Rosenkrans, Real-Time Awareness, Flight Safety Foundation, Jun. 2012, pp. 38 to 41.

U.S. Department of Transportation, Advisory Circular No. 150/5300-14C, Federal Aviation Administration, 2013.

Safe Winter Operations—Boeing Aero Magazine, 2010.

U.S. Department of Transportation, Large Aircraft Ground Deicing, Federal Aviation Administration, 1992.

How does de-icing work? Behind the Scenes @AmericanAir available at https://www.youtube.com/watch?v=2ZcsoP1AUTI.

Aviation Investigation Report A10W0040, Runway Incursion, Nav Canada, Calgary International Airport, Alberta, published Mar. 2, 2010.

History, Processing and Usage of Recycled Glycol for Aircraft Deicing and Anti-Icing, DOT/FAA/AR-00/55, dated Feb. 2001.

Guidelines for Aircraft Ground Icing Operations, Issue 7.1, dated Nov. 2022.

AIM Systems-Presentation, JCAI, dated Jan. 11, 2013.

Transport Canada Holdover Time (HOT) Guidelines Winter 2010-2011.

* cited by examiner

Pad Operation

Gate Operation

Figure 5h

METHOD AND SYSTEM FOR AUTOMATING AND CONFIGURING AN AIRCRAFT DE-ICING PAD FACILITY

CROSS-REFERENCE TO OTHER APPLICATIONS

This application claims priority from U.S. Provisional Application No. 62/633,674 Filed Feb. 22, 2018 which is hereby incorporated by reference.

FIELD

The disclosure is generally directed at the aviation industry and, more specifically, is directed at a method and system for automating and configuring an aircraft de-icing pad facility.

BACKGROUND

In the aviation industry, the ability to keep aircraft on schedule is an important task. While this may be easier during nicer weather, in the winter, the weather will typically affect scheduled departure times. One of the reasons for this is that aircraft need to undergo a de-icing process in order to remove ice build-up on the wings and fuselage of the aircraft. However, the number of de-icing bays within a de-icing facility or facilities, such as within an airport, is typically much lower than the number of aircraft that are preparing for take-off at any one time. As such, there is a need to manage these aircraft in order to facilitate the de-icing process for aircraft within an airport.

Therefore, there is provided a method and system for automating and configuring an aircraft de-icing pad facility.

SUMMARY

The disclosure is directed at a method and system for automating and configuring an aircraft de-icing pad facility. In one embodiment, the system uses environment representative graphics from a top view perspective for facilitating and co-ordinating (automated and remote) de-icing services for aircraft. In another embodiment, the system includes a central processing unit (CPU) that directs aircraft (or pilots) through the de-icing process at an airport. Initially, a de-icing inbound queue is created and the system communicates with the pilot (such as via electronic message boards, airfield ground lighting, thermal sensory equipment, and utilizing signals from location devices on the aircraft or by triangulation systems (M-LATS]) to guide the pilot through the airport from the gate, to the de-icing facility, to the runway.

One advantage of the system and method of the disclosure is the provision of a highly efficient and co-ordinated management and operational platforms of automation and/or remote command and control of de-icing services for aircraft.

In another embodiment, the disclosure also includes the co-ordination of messages via the electronic message boards to assist the pilot in navigating the tarmac. In another embodiment, the disclosure also includes the controlling of lights, typically, located on the ground, to assist the pilot in navigating the tarmac by providing these lights to guide the aircraft from location to location such as from the gate to the de-icing facility to the runway. In one embodiment, all active components of the guidance equipment are displayed on a user interface in real-time to provide a pilot a graphical simulated live view of the conditions of their de-icing operation.

In one embodiment, the disclosure can be seen as a system that includes at least one software module that provides a terminal gate graphical representation and active client interface, a set of electronic message boards, taxiway lighting and positioning technologies for the aviation de-icing industry that facilitates the precise and efficient real-time coordination de-icing of aircraft.

In another embodiment, the disclosure is directed a computer readable medium having instructions stored thereon that, if executed, cause at least one processor to control LED Message boards, airfield lighting and positioning/metering and docking technologies as well as visual surveillance technologies for the aviation de-icing industry that facilitates the automated and remote management operations of aircraft traffic for engines on and at CDF gate operations for the de-icing of aircraft.

In one aspect, there is provided a method of facilitating de-icing for an aircraft including placing the aircraft in an inbound queue; determining a location for de-icing of the aircraft; and guiding the aircraft to the location.

In another aspect, determining the location includes processing aircraft characteristics; and selecting a location for de-icing based on the aircraft characteristics. In a further aspect, aircraft characteristics include size of aircraft, takeoff runway of aircraft and current location of aircraft. In yet a further aspect, guiding the aircraft includes transmitting messages to the aircraft via electronic message boards. In another aspect, guiding the aircraft further includes illuminating ground lights to generate a lighted path for the aircraft. In yet another aspect, guiding the aircraft includes determining an aircraft position of the aircraft; determining a de-icing position of a de-icing bay; and determining a path from the aircraft position to the de-icing position. In another aspect, determining the aircraft position includes using sensor equipment, cameras, MLATs or location devices on the aircraft to determine the aircraft position. In yet another aspect, guiding the aircraft to the location locate includes determining aircraft type; generating a safety zone based on the aircraft type; and guiding the aircraft to the location based on the aircraft type. In another aspect, the method includes monitoring the safety zone to ensure no obstacles in the aircraft's travel path when guiding the aircraft.

BRIEF DESCRIPTION OF THE DRAWINGS

Embodiments of the present disclosure will now be described, by way of example only, with reference to the attached Figures.

FIGS. 5a to 5k are further screenshots of a system for aircraft de-icing scheduling and guidance;

DETAILED DESCRIPTION

In order to facilitate the de-icing of an aircraft, the disclosure provides a system and method for managing the de-icing process from a central point of control, thereby reducing, and possibly eliminating the need for people and/or motorized equipment to marshal aircraft.

Figure 1:
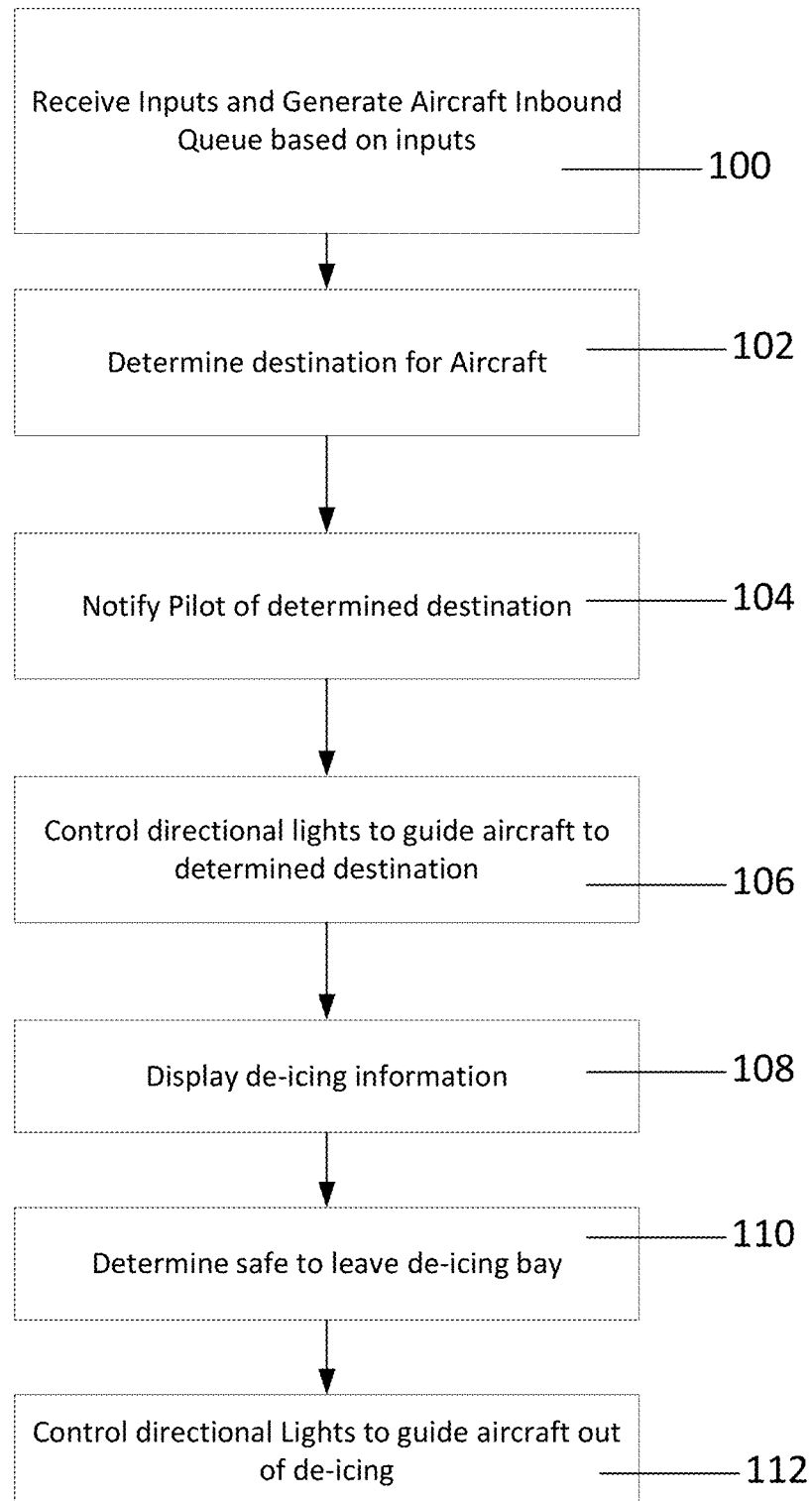
FIG. 1 is a flowchart outlining a method of aircraft de-icing scheduling and guidance.

Turning to FIG. 1, a flowchart outlining a method of facilitating the de-icing of an aircraft is shown. In one embodiment, the method may be executed via instructions stored on a computer-readable medium. The system of the disclosure may be seen as a system for scheduling and guidance of an aircraft through a de-icing process. Initially, an aircraft inbound queue is created or generated (100). The inbound queue includes or represents all of the aircraft that are waiting for de-icing in the airport and is typically created via a combination of inputs received from other computer systems (such as from an IceLink™, or de-icing, system or an automated aircraft information system) or manually input by an individual such as, but not limited to, an operator or a pilot. An example of manual input may include where an operator enters aircraft information relating to an aircraft that has requested de-icing or where an Air Traffic Control (ATC) or airport tower has requested service.

Alternatively, when an aircraft is directed by ATC to push back from a gate, if de-icing is required, the pilot can request de-icing whereby the aircraft is then placed in the aircraft inbound queue based on information input by the pilot. Alternatively, the ATC may request an aircraft go through a de-icing process and then enters aircraft information into the system. Based on this information, the aircraft is entered into the aircraft inbound queue whereby the system then routes or guides the aircraft to a de-icing facility based on the aircraft inbound queue.

In another example, once the system receives a de-icing request from a pilot, the system receives or retrieves information associated with the aircraft for which the pilot made the request in order to input the aircraft information into the system so that the aircraft can be entered into the aircraft inbound queue. In a gate operation, where the engines are off and the aircraft is to be treated before leaving its parked position at the gate, a pilot may make a de-icing request via an application in the system, such as via a de-icing system, and that request is sent to a de-icing dispatcher who then enters the aircraft information into the aircraft inbound queue.

In another embodiment, the system receives or retrieves aircraft information, such as via a central repository, which allows the aircraft inbound queue to be created or modified. This may be performed automatically once a de-icing request is received by the system. Alternatively, aircraft information can be automatically entered into the aircraft inbound queue by retrieving information directly from the aircraft control system that requested the de-icing service.

Once in the queue, the system then determines where the aircraft should go (102) for de-icing or in what order and sequence an aircraft should be treated (gate operation) based on the availability of bays or de-icing machinery within the de-icing facility or facilities. A gate operation is when de-icing machinery travels to the aircraft location to perform the de-icing procedure. In making this determination, different criteria may be used including, but not limited to, size of aircraft vs size of bay or bays and/or proximity of de-icing facility to departure runway. Other criteria may include, but not limited to, earliest scheduled departure, mainline or international flights priority, and given the first to points proximity of the nearest de-icing truck to required service tag.

Figure 2A:
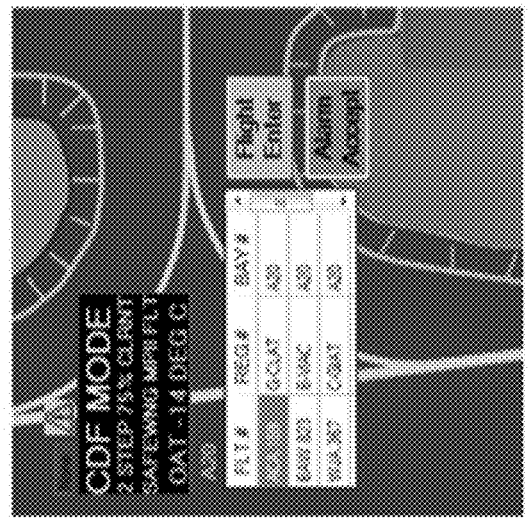
FIGS. 2a to 2d are screenshots of a system for aircraft de-icing scheduling and guidance.
Figure 2B:
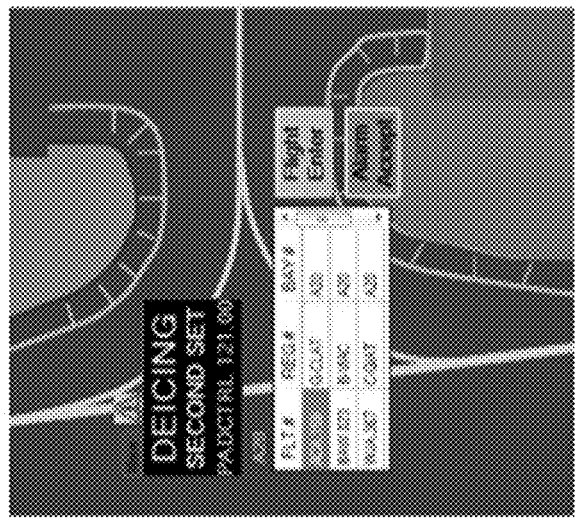
Figure 2D:
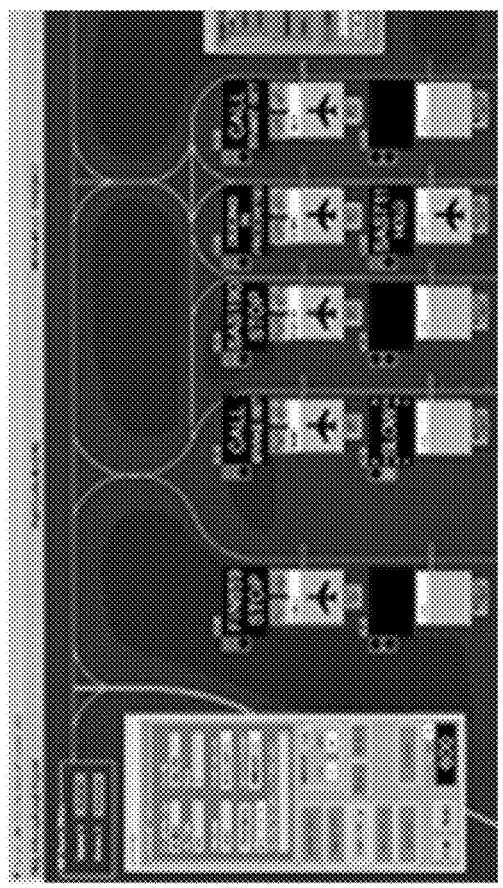
Figure 2C:

After making the determination, the system can then instruct the pilot where to go to receive the de-icing service (104). In one embodiment, the system transmits a signal or message directly to the pilot via a communication system such as a signal to a display in the cockpit of the aircraft. Alternatively, the system may transmit a signal or messages to at least one electronic message board (EMB) display that is located throughout the airport. The signal may be a message representing instructions to the pilot regarding the location to go to in order to receive de-icing service. This is schematically shown below with example screen shots (FIGS. 2*a* and 2*b*) of what an operator of the system may see. In FIG. 2*a*, a listing of queued flights at bay A20 are shown and the message board may have the message CDF Mode for the pilot. The system, such as in the form of a Bay Management module, is preferably designed and tailored to assimilate to and graphically represent the airport including the airport's de-icing facility or facilities. Examples are schematically shown in FIGS. 2*c* and 2*d* which are screen shots of a gate operation de-icing view and a pad, or de-icing facility, de-icing view.

In one embodiment, if the information is transmitted to the pilot via one or more EMBs, the pilot may be notified of his location (or position) within the aircraft inbound queue and/or the radio frequency with which to contact a pad controller (which may also be seen as a system or an individual who controls the de-icing pad or bay).

Through the message, the pilot may be notified where to go for de-icing. In a preferred embodiment, the system may then illuminate directional lights (106) such as in the taxiway to direct the pilot to the assigned de-icing bay to or within the de-icing pad or facility. The system may use positioning technologies to turn on and then off the correct lights. The state of the directional lights and the EMBs may also be displayed for a controller or operator of the system to review. Schematic diagrams of what a controller may see are shown in FIGS. 3*a* to 3*d*.

In one embodiment, the determination in (102) is performed in order to prepare the aircraft for de-icing. Alternatively, in another embodiment, the determination is performed when the aircraft is at the head of the aircraft inbound queue. In this embodiment, once the aircraft is at the front of the queue, the pilot is notified either by the EMB or radio or both of the de-icing bay to proceed to. The system may continue to illuminate the taxiway directional lights to assist the pilot into the de-icing bay.

Figure 3D:
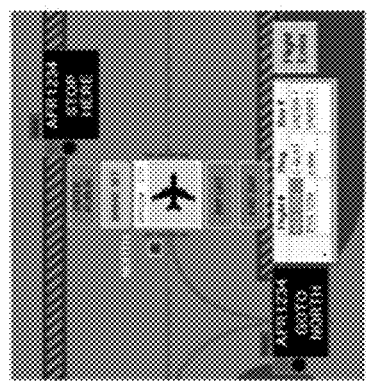
FIGS. 3a to 3d are controller screenshots of a system for aircraft de-icing scheduling and guidance.
Figure 3C:
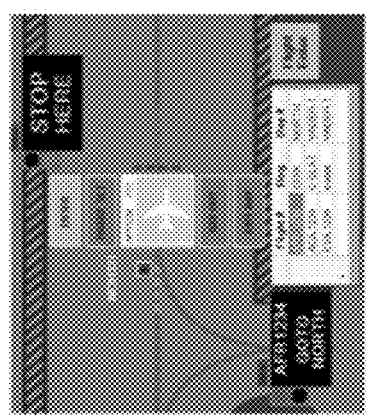
Figure 3B:
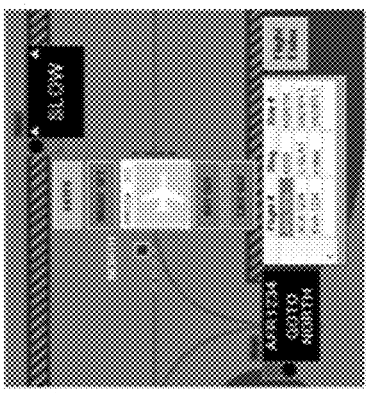
Figure 3A:
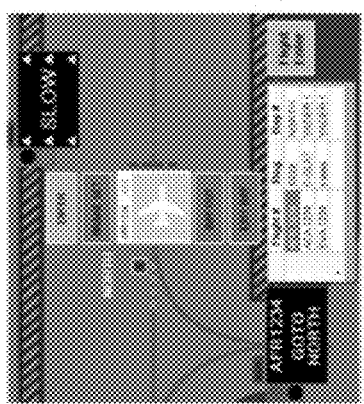
Figure 3E:
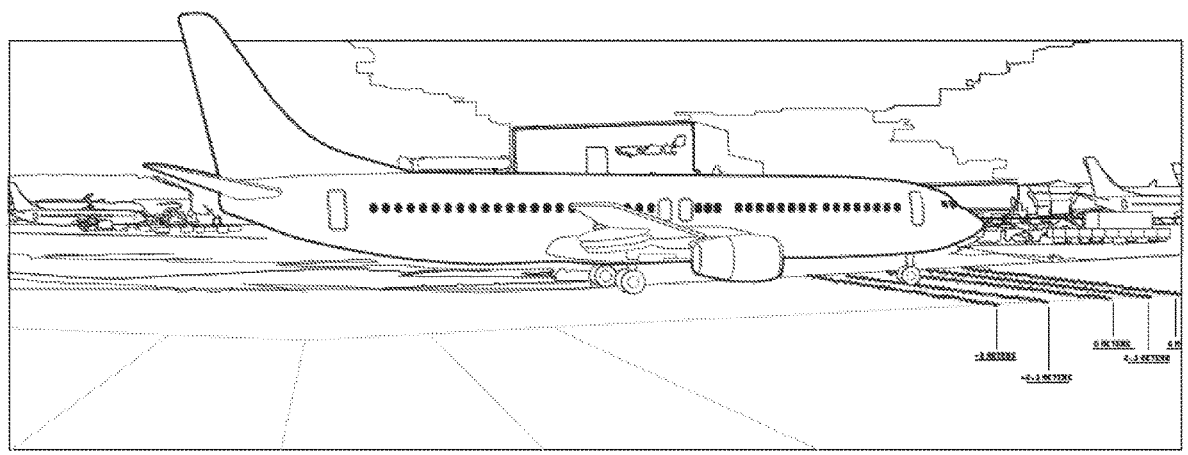
FIG. 3e is a photograph of a stop bar for use in a system for aircraft de-icing scheduling and guidance.

As will be understood, using positioning technologies and the EMB or EM BS, the pilot may also be provided instructions to slow and then stop the aircraft at a precise position that is preferred for safe and efficient de-icing. Photographs showing directional lights are provided in FIG. 3*e* with stop bars 500. The stop bars may be colored green, yellow and red to assist the pilot in positioning the aircraft in a safe zone.

Figure 4C:
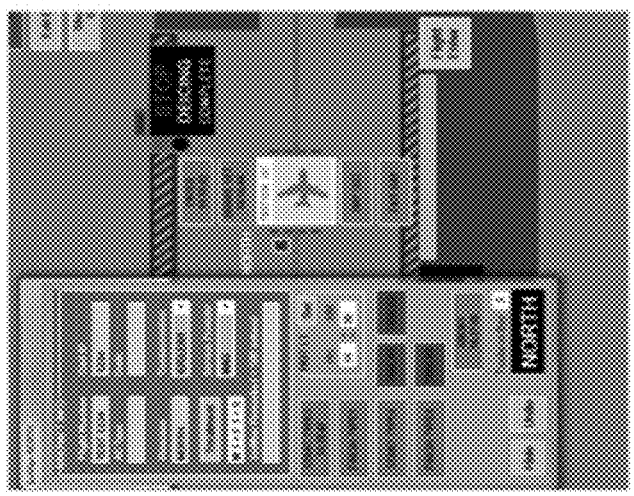
FIGS. 4a to 4e are further screenshots of a system for aircraft de-icing scheduling and guidance.
Figure 4B:
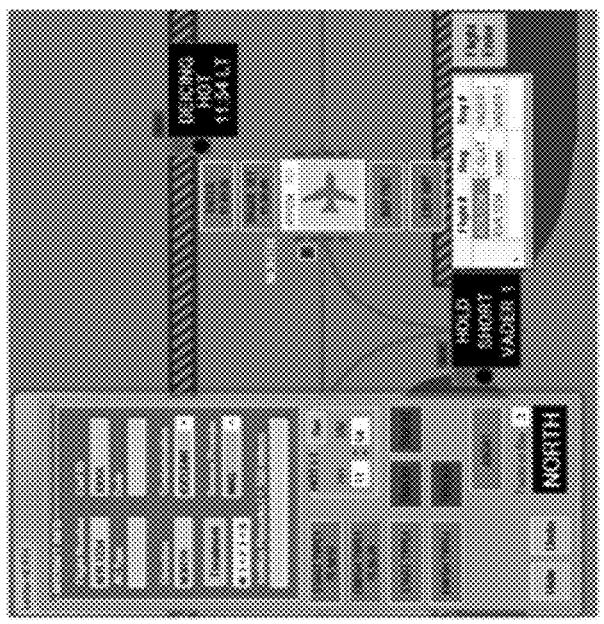
Figure 4A:
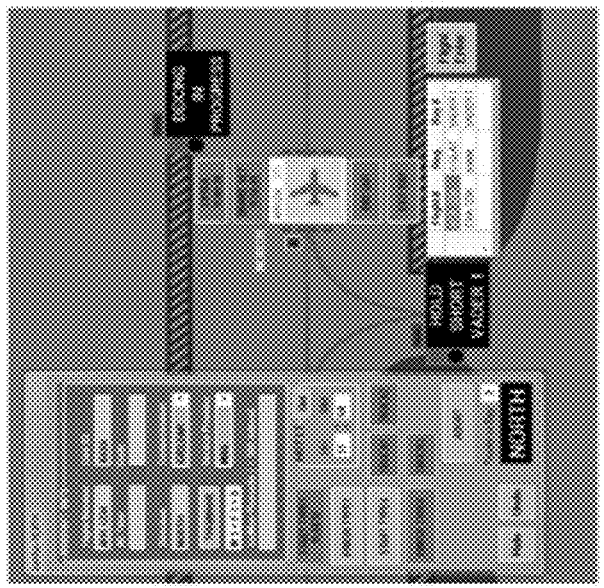

In another embodiment, the system may also provide the ability for virtual tower technology that allows de-icing personnel, or any other individuals, to view aircraft in the de-icing bay. As the de-icing process proceeds, the system may display further information on the EMB or EMBs (108). This further information may be seen as informational messages to the pilot. Schematic diagrams of how this may look (as may be shown to the controller) are shown in FIGS. 4a to 4c.

Figure 4D:
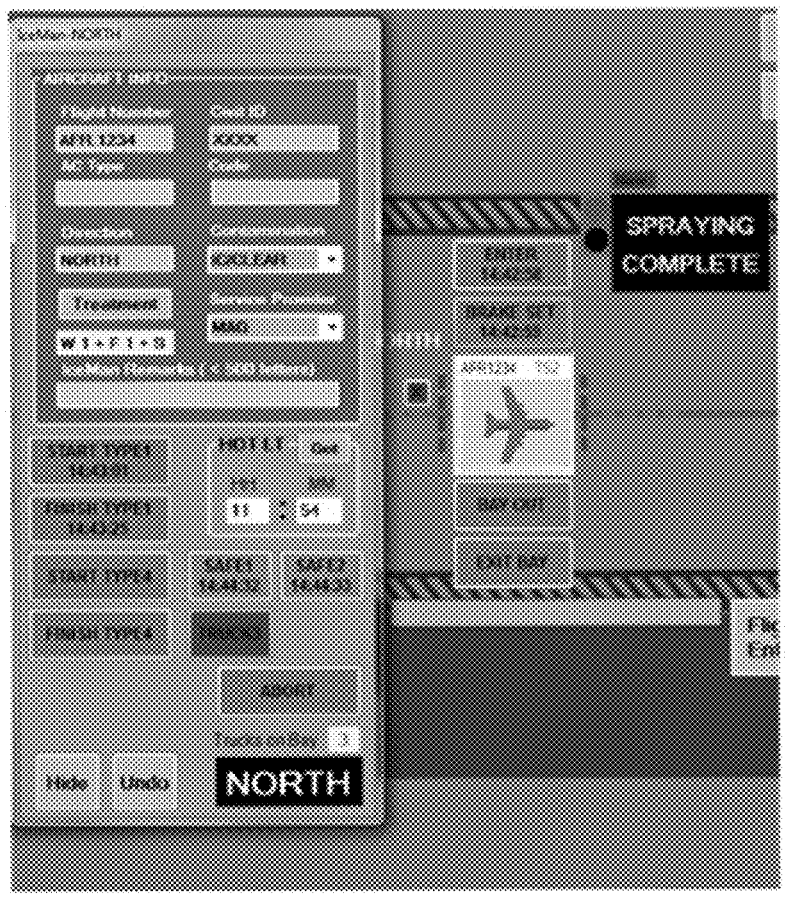

When de-icing is completed, and de-icing equipment and personnel are in safe positions, the system may then notify the pilot to proceed (110) such as via the EMBs (and radio). An overview of what a controller may see is shown in FIG. 4d.

Figure 4E:
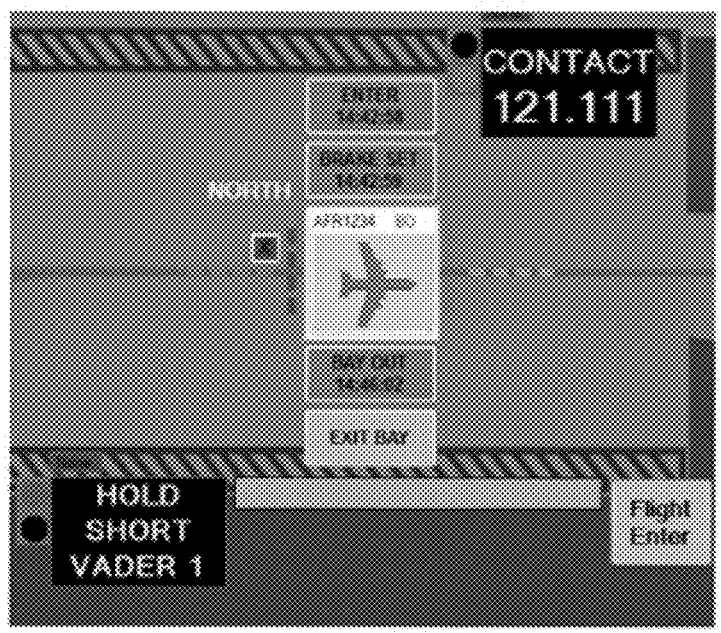

Once the pilot has been notified, the system may transmit signals to illuminate taxiway directional light or lights (112) to assist the pilot to leave the de-icing bay. In one embodiment, the system may use positioning technologies to turn on and then off the correct lights. An overview of what a controller may see is shown in FIG. 4e. The green lights 502 indicate to the pilot to proceed forward while the red lights 504 indicate to the pilot to not reverse the aircraft. Other aircraft information may be displayed to the operator such as the brake status of the aircraft.

In order to improve the system, information associated with every part of the process may be stored in a database for future retrieval and reference. In other words, analytics may be used to improve the system.

Figure 5A:
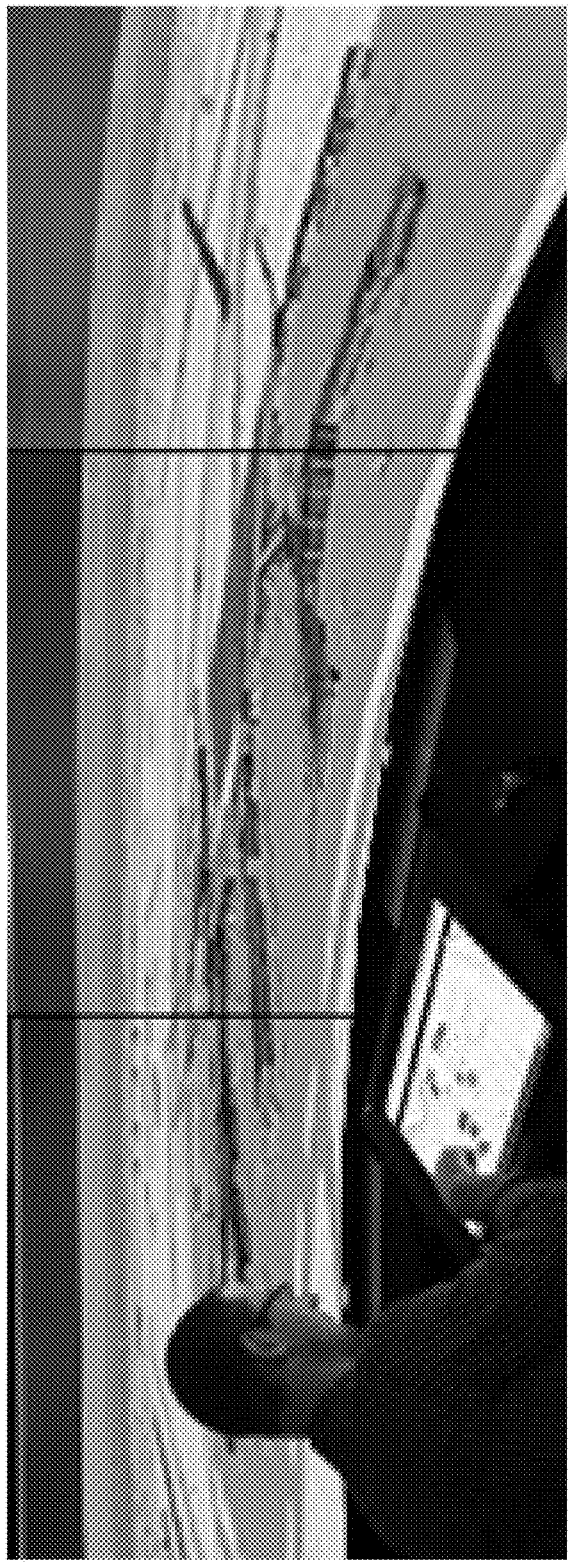
Figure 5B:
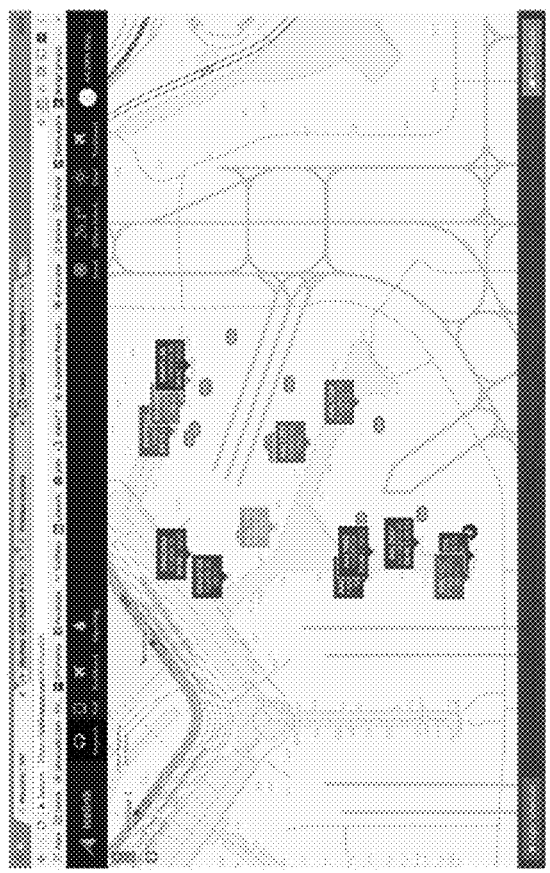
Figure 5C:
Figure 5D:
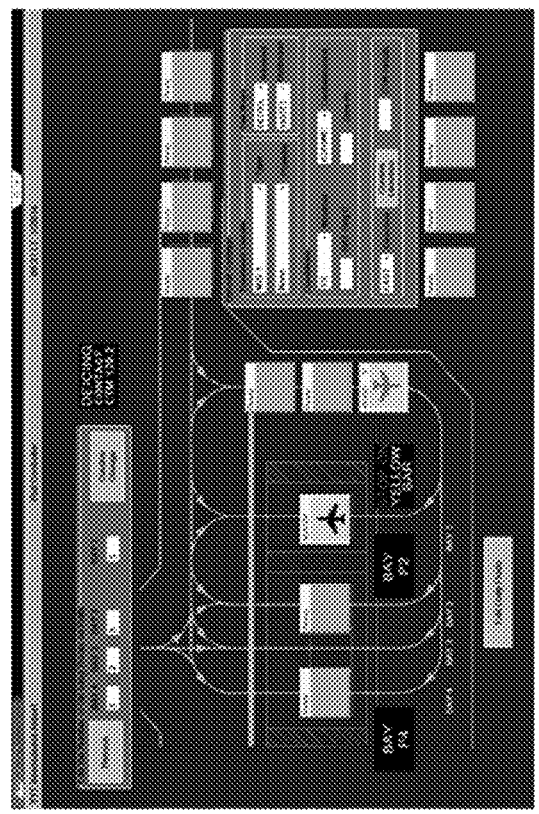

As shown in FIG. 5a, a controller within the ATC tower may be able to review various screen shots (which in this figure relates to a gate de-icing operation) providing an overview of the airport and where aircraft and de-icing bays may be located. An indication where EMBs are located may also be displayed. An example screen shot of that the controller is looking at is shown in FIG. 5b. As such, the controller may independently manage the de-icing process, such as a gate operation or a pad, or central de-icing facility (CDF) operation and/or any machinery respectively directly via a tablet or computer system or the system may be able to do it autonomously. The controller may remotely manage and command and control all de-icing operations of any size scale and scope, either engines on or gate, stand, area, CDF etc . . . All Management, direction, commands, situational awareness, status of aircraft and de-icing fleet, Airline Flight Schedule, weather systems (such as hold over times), flight strips, other software modules related to de-icing can be housed, interpreted and received and/or pushed out to the operation/airport in real time remotely from any location. Multiple operations can be run from one central point location. FIG. 5c provides a photograph of a controller viewing a display showing a pad-de-icing operation with FIG. 5d being a schematic screen shot the controller may be looking at.

Figure 5E:
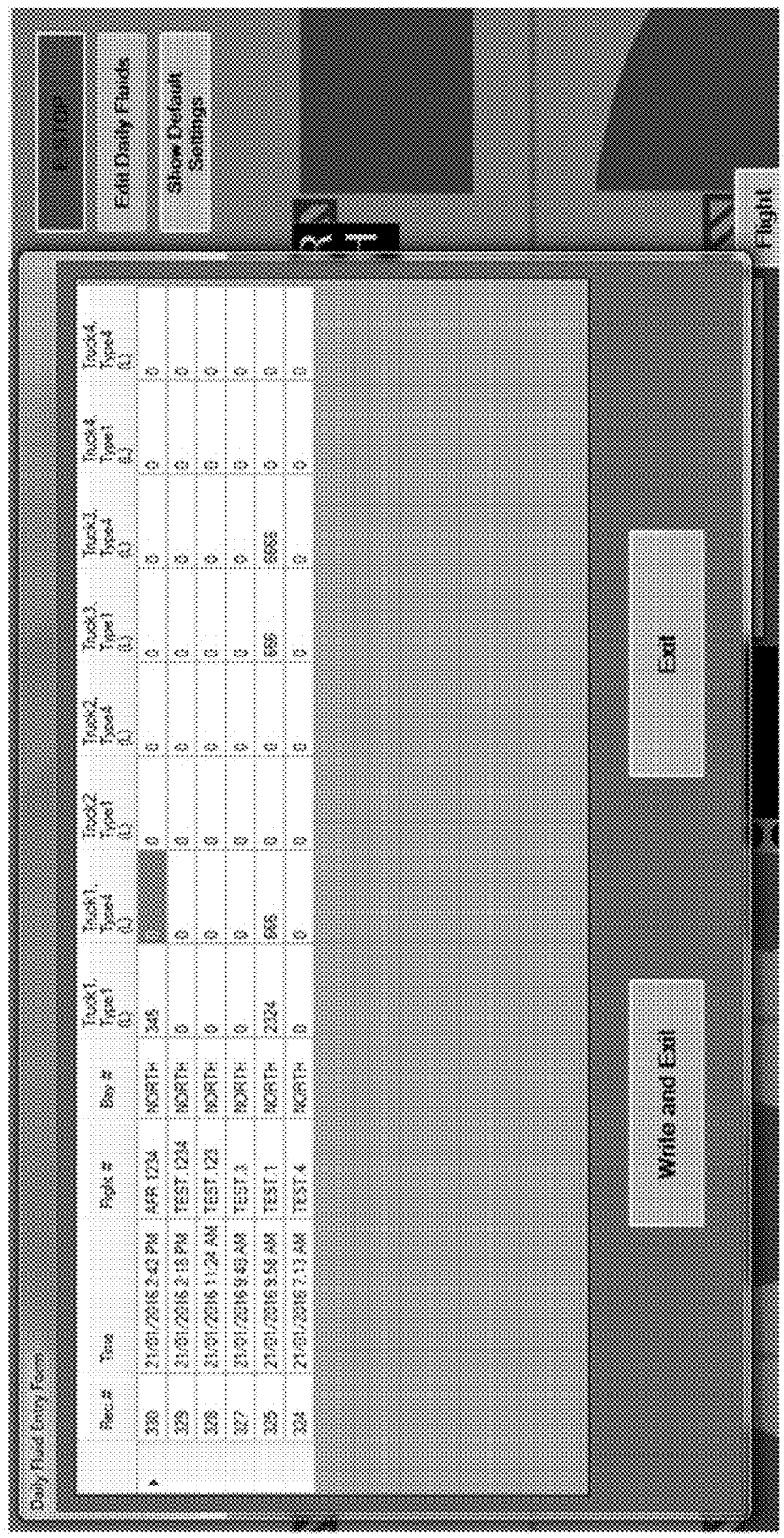
Figure 5F:
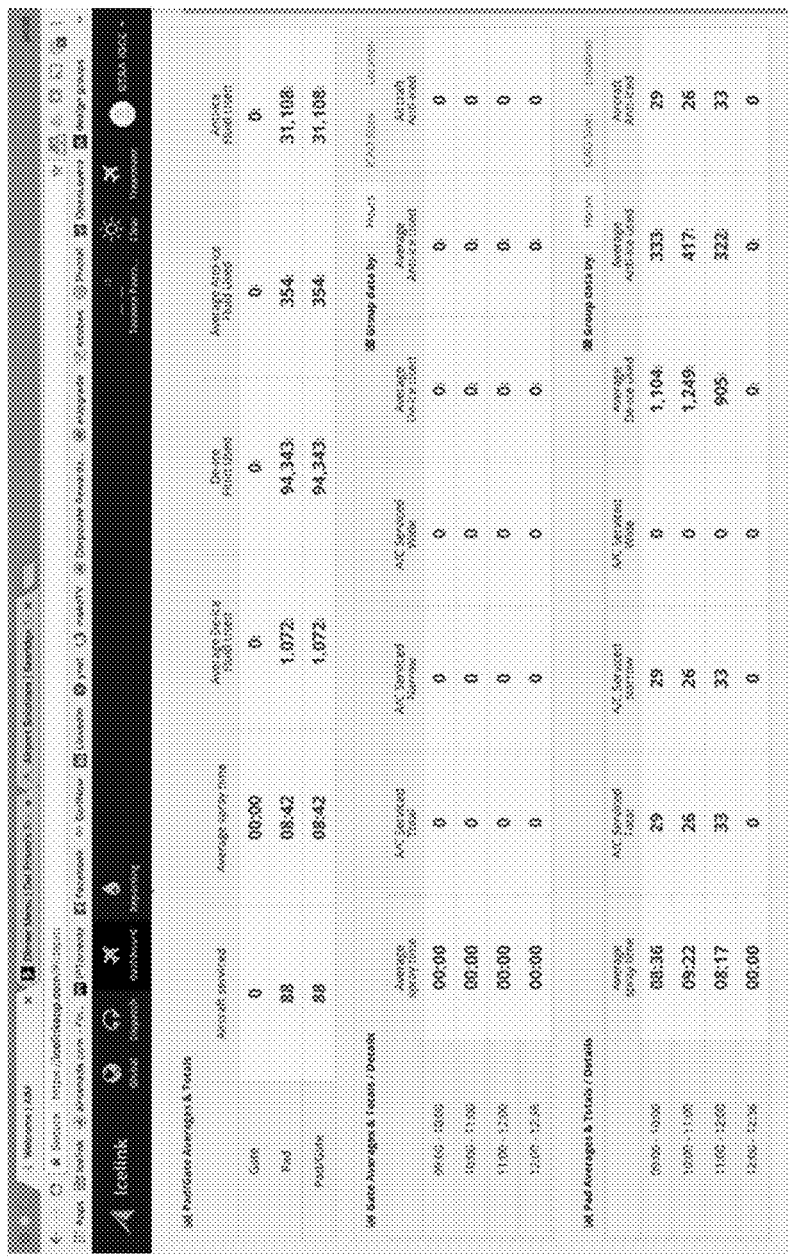
Figure 5G:
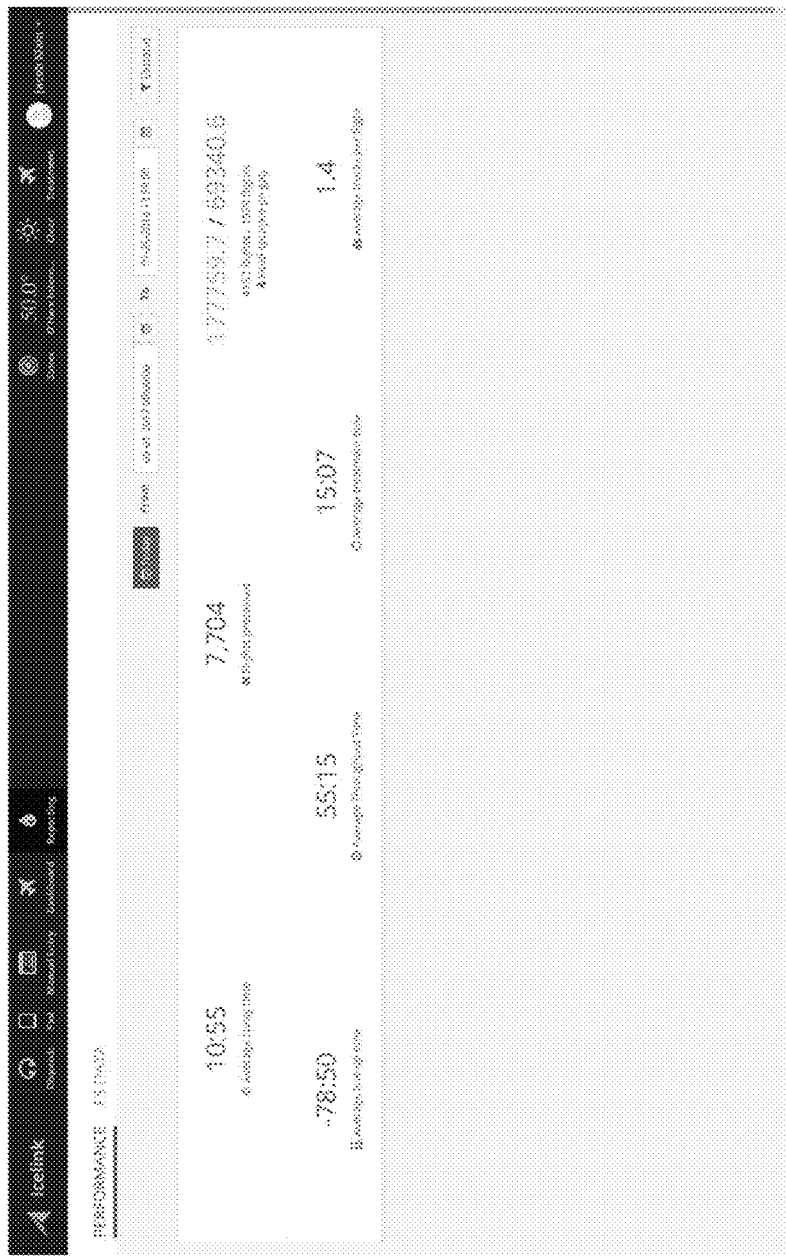
Figure 5H:
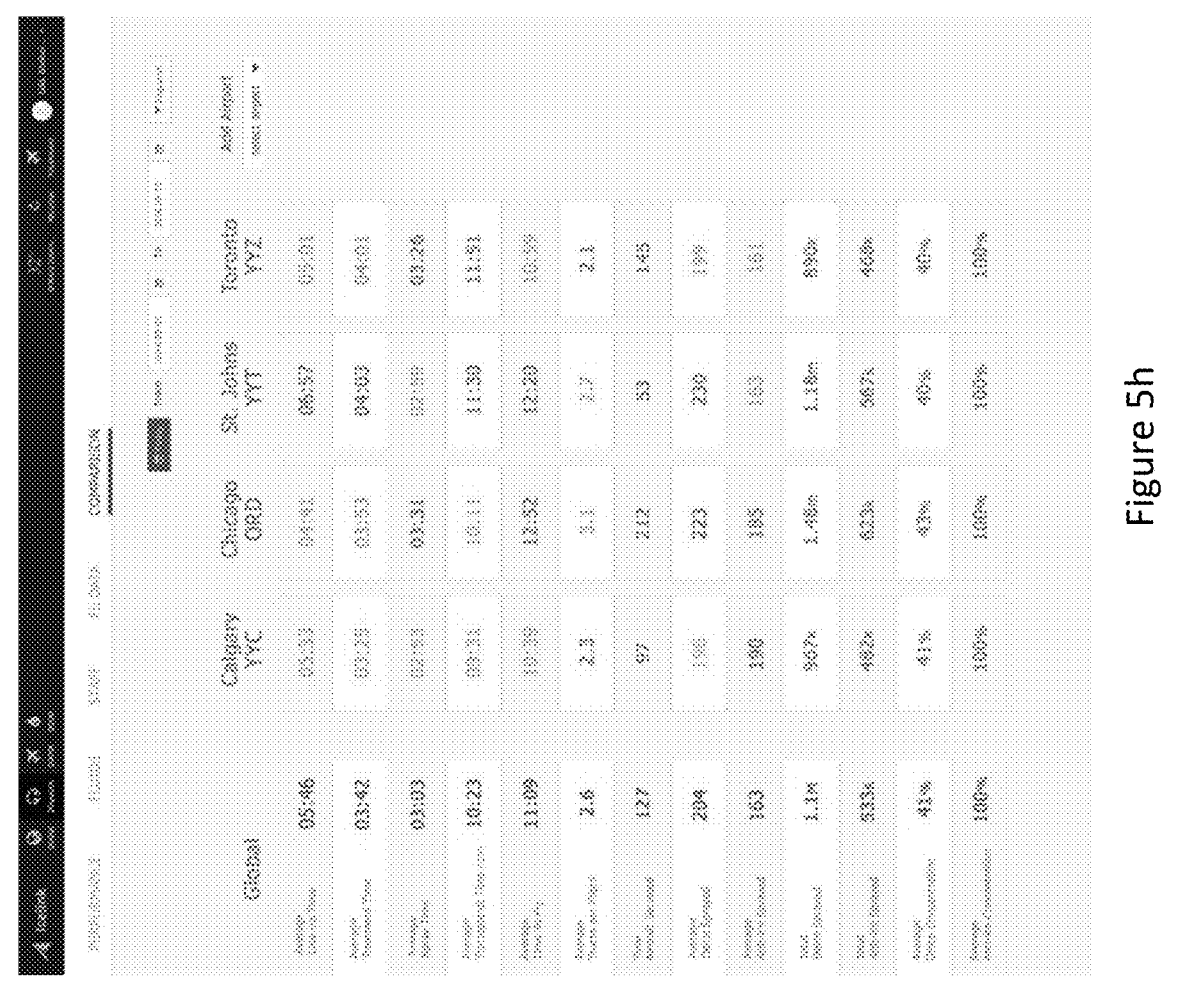
Figure 5I:
Figure 5J:
Figure 5K:

Further schematic screenshots are shown in FIGS. 5e to 5k. FIG. 5e is a De-icing Fluid Flow screenshot, FIG. 5f is a De-icing performance dashboard screenshot, FIG. 5g is an Average treatment times and fluid usage screenshot, FIG. 5h is a Measurements comparatives against other airports screenshot, FIG. 5i is a Trending and overall conditions screenshot, FIG. 5j is a Trending KPIs Staff screenshot; and FIG. 5k is a Trending KPIs overall performance screenshot. Each of the screen shots may provide further information regarding the de-icing equipment to the operator.

Advantages of the disclosure include, but are not limited to, increased aircraft throughput in the de-icing facility, reduced chemical usage; and increased safety to aircraft and to de-icing operations personnel; a measurable and manageable de-icing process; and metering aircraft throughout the de-icing processes to determine overall de-icing processes times to assess overall airport performance.

Figure 6:
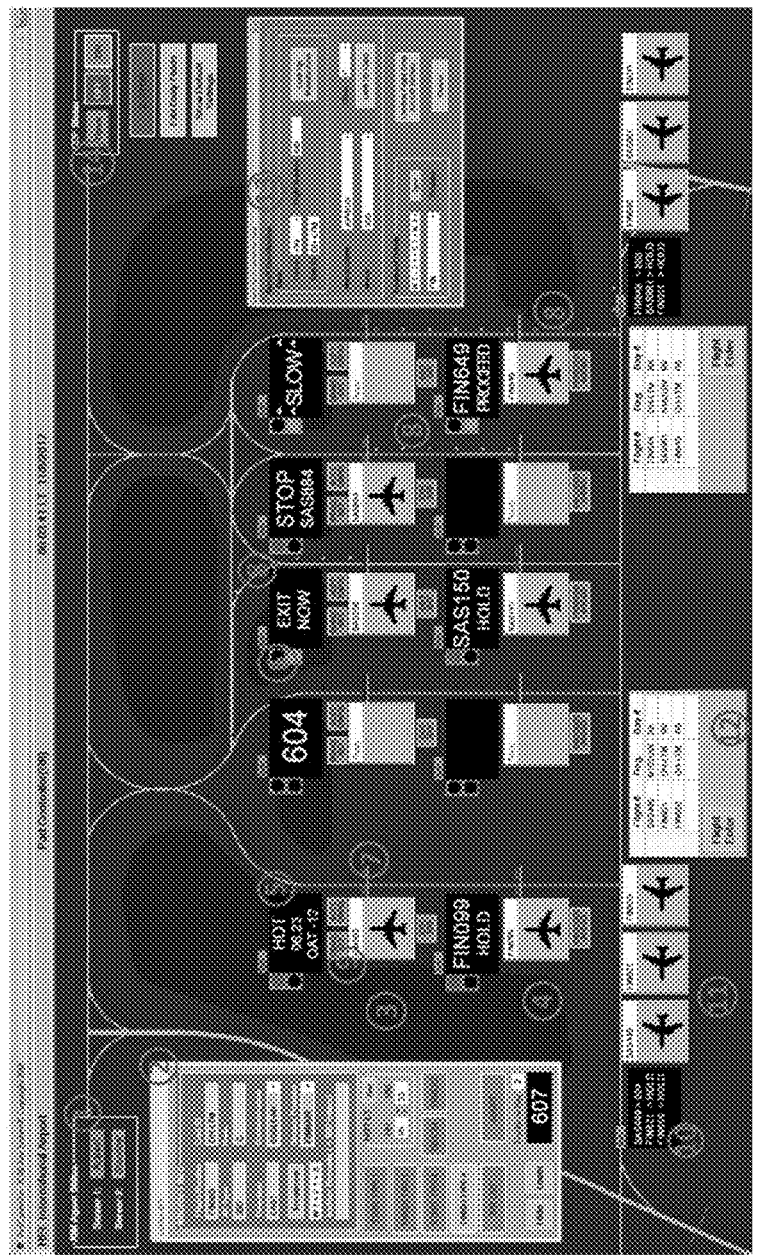
FIG. 6 is an overview screenshot.

In another embodiment, as shown in the screenshot of FIG. 6, the method is initiated when a request is made by an aircraft for de-icing. As the request is made, the aircraft may physically join a queue waiting for permission to enter a holding or de-icing bay. Along the bottom of FIG. 6, it can be seen that aircraft SAS449, FIN821, FIN659 are in a queue 220 to enter de-icing bays on one side of the facility while aircraft FIN649, SAS861 and FIN001 are in a queue 222 to enter de-icing bays or pads on the other side of the de-icing facility. EMBs 224 provide further instructions or information to the pilot such as in the form of different messages. Aircraft waiting in the queue may change positions or leave the queue based on these messages. As such, the controller (or the system) may then move or delete aircraft using the display the screen to update the queue.

The system may also radio the aircraft at the front of a queue and provide permission to enter a holding bay. As schematically shown, aircraft FIN099, SAS150 and FIN649 are in holding pads (positions) waiting to proceed into de-icing bays.

Once a de-icing bay is empty, the controller (or the system) radios the aircraft pilot and gives permission to proceed to a de-icing bay. As the aircraft proceeds into a holding or a de-icing bay, the system of the disclosure may perform other functions including, but not limited to, detect the position of the aircraft; turn on taxi way lead in lights to assist the pilot in maneuvering into the correct; and/or turn on a stop bar that is perpendicular to the taxi way lights to assist the pilot in stopping the aircraft. The system may also display on the electronic message boards distance to stop bar information so that aircraft FIN583, SAS258, SAS884 (which are in the process of being de-iced) do not crash into equipment or structures as it is entering the de-icing bay As the aircraft is de-iced, the system, via the EMBs, may provide further information to the pilot. This information may include, but is not limited to, the outside air temperature (OAT); the type of de-icing fluid being applied; and/or the hold over time (HOT).

Once de-icing is complete, the system may provide, such as via the EMBs, instructions to the pilot for exiting the bay. As before, the system of the disclosure may also activate taxiway lead out lights to assist the pilot in exiting the bay.

As schematically shown in FIG. 6, the system of the embodiment further includes a pair of redundant computers 226 that execute the system of the disclosure. If one of the computers or applications fails, the other application takes over. In the current Figure, the display shows the status of the system of the disclosure on each computer 226. The system may further include a de-icing system dialog 228. The de-icing system dialog is used for interacting with aircraft in a de-icing bay. In the current Figure, aircraft FIN583 is being de-iced in the left most bay. The de-icing step is "FINISH TYPE 4" which may represent anti-Ice fluid is being applied. The system may further include a display of de-icing bays 230, holding bays 232. The display may also include an illuminated stop bar 234 to assist pilot in positioning the aircraft for de-icing with damaging the aircraft. The display may also show a set of illuminated lead in and lead out taxiway lights 236. Aircraft details may also be entered via this display screen.

All of the information entered into the dialogs are preferably stored in a database, such as a flight strip database. As the aircraft proceeds through de-icing, each step is time stamped and stored with the flight strip database. This flight strip information ca be shared through the Internet with external or integrated systems.

Figure 7:
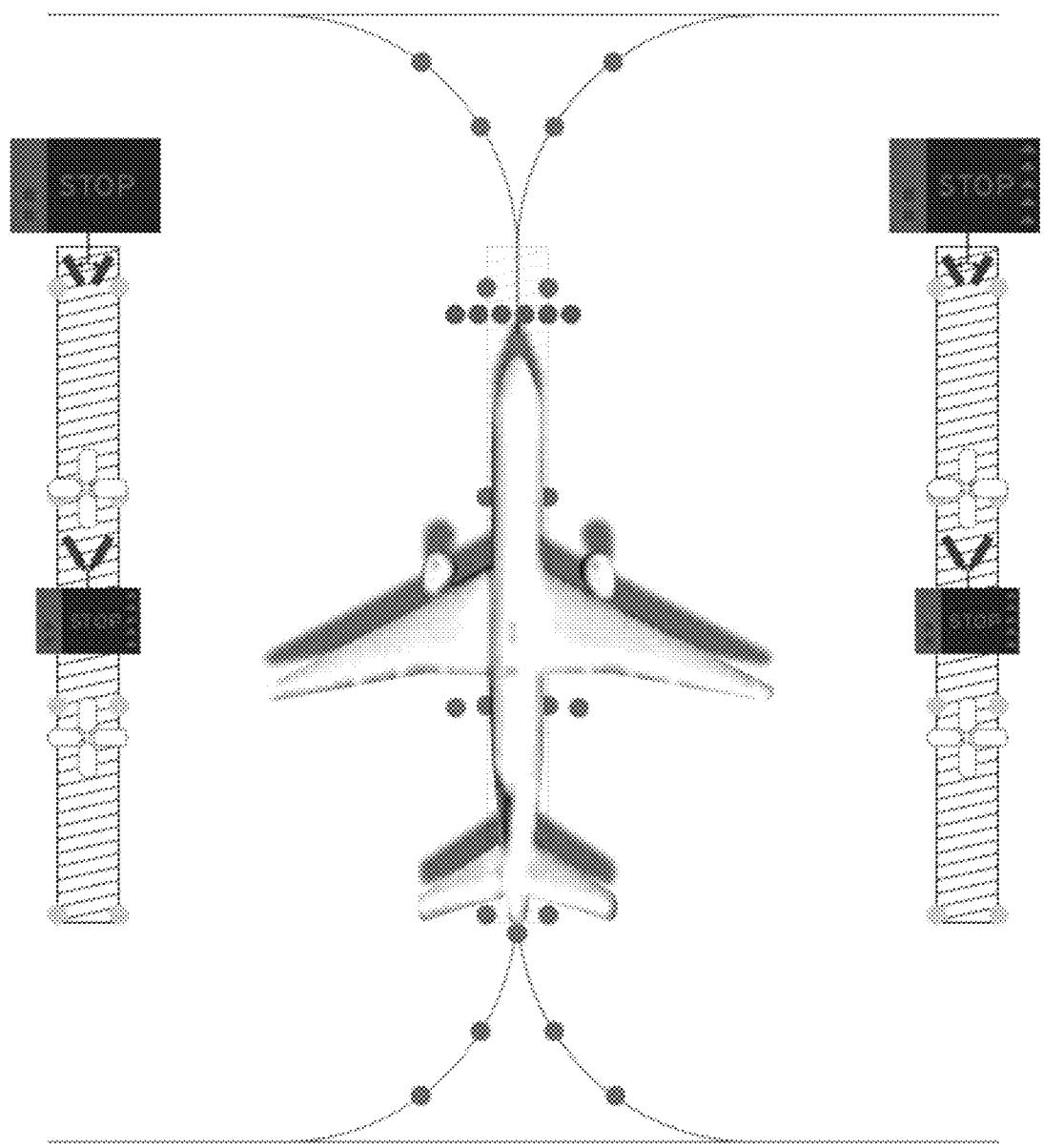
FIG. 7 is a schematic diagram of safety zones around an aircraft.
Figure 8:
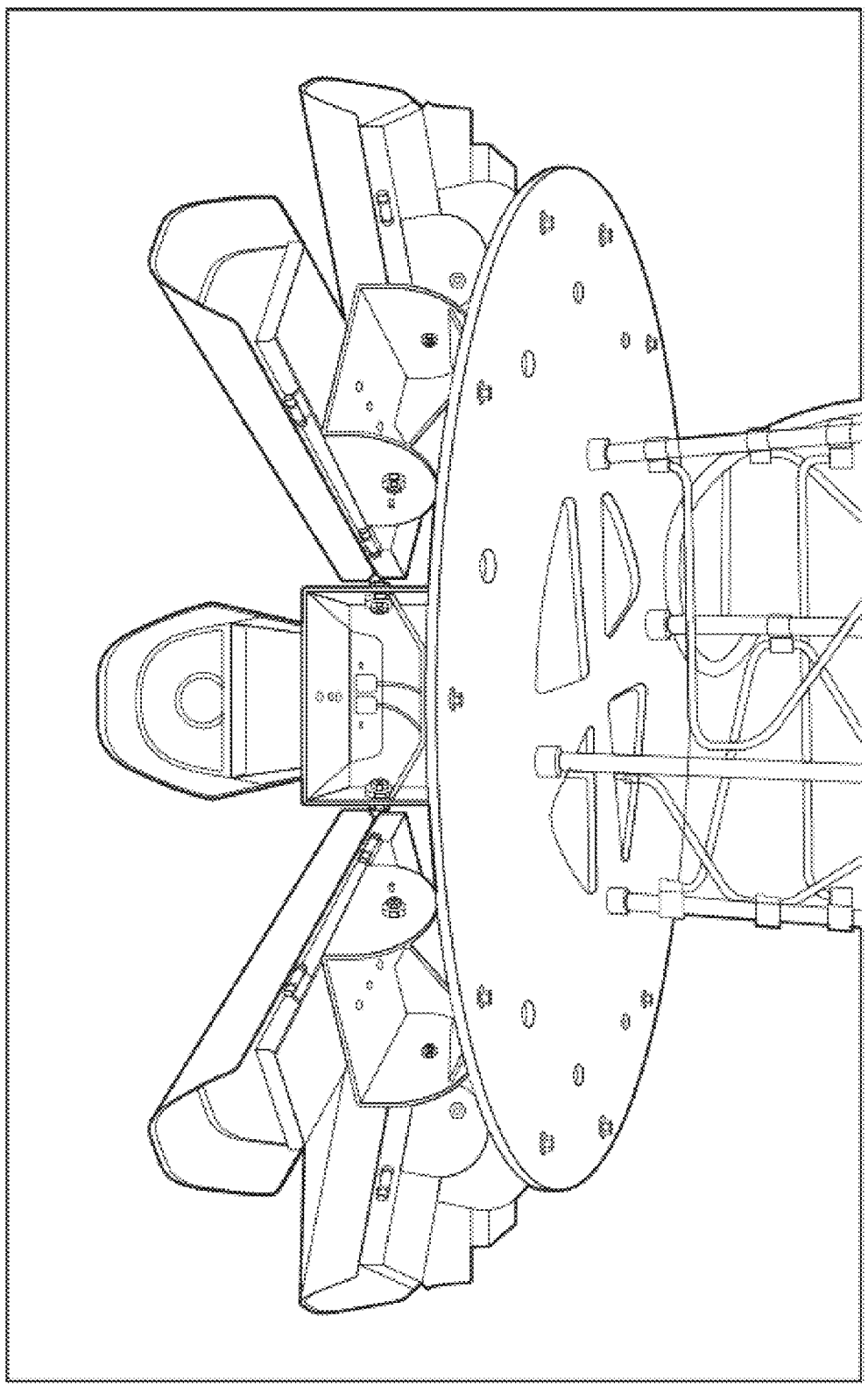
FIG. 8 is a photograph of a tower for use in a system for aircraft de-icing scheduling and guidance.

In another embodiment, the system may provide, such as via a screen or display as schematically shown in FIG. 7. In the current Figure, two safety zones are indicated with the center of the de-icing bay is indicated by the circle 300. In the current example, one EMB 301 is in a corner of one of the safety zones 302. In a preferred embodiment, angling of the face of the EMB is about perpendicular to the center of the bay for ease of review by the pilot. For this embodiment, this location was chosen so that the pilot can see the EMB (120 degree visibility) as the pilot enters the bay to the stop bar as the EMB is preferred to be at right angles to the centerline close to the bow of the aircraft; the position provides a larger or maximum area for de-icing rigs to park in the safety zone; and the position provides good field of view for the thermal cameras which may be used for aircraft detection. This is disclosed in more detail below.

In one embodiment, the thermal camera may be Bosch FLIR-F-Series thermal cameras that are mounted below the EMBs, or on a mast at an appropriate location or position. In a preferred embodiment, the camera height from the ground is approximately 8 ft. but may be changed depending on its use or application. Each camera preferably has a field of view (FOV) of about 70 degrees to detect aircraft nose wheels as they enter, transit and exit the bay. The camera FOV is indicated by the green lines. There are to be no objects within the FOV during detection operations The bar 304 in the safety zone is one possible limit of where a de-icing rig and its boom can be parked such that it will not be damaged by the aircraft or cause damage to the aircraft.

In another embodiment, the system may perform one or more functions (or methods) including, but not limited to: 1) structuring the flow of aircraft into and out of a de-icing facility; 2) providing the ability for an individual to view the entire de-icing operation; 3) providing an operator a graphical representation of all de-icing equipment and their inventory status/location and personnel aboard with time stamps at task completion intervals and activates/deactivates/displays/status all necessary guidance equipment; 4) using airfield lighting equipment to illuminate and illustrate the path for a specific aircraft which is addressed by an operator; 5) using EMBs to display messages with standardized directions for aircraft movement into, around and out of a de-icing facility and a bay within the de-icing facility; 6) using specialized technologies (such as, but not limited to, thermal metering camera equipment and satellite based aircraft tracking software to track, guide, position and stop aircraft movement in and around the de-icing facility); 7) using specialized lighting technologies and techniques to direct aircraft into, out off and around the de-icing facility that is preferably dedicated to specific aircraft movement and treatment in operational requirements and conditions; 8) automating aircraft movement; 9) using EMBs to display standardized messages concerning the de-icing activities occurring to and around the aircraft; and 10) storing in a database important information for improving aircraft de-icing efficiency; long term safety auditing; de-icing chemical application, storage and reclamation; KPI and benchmarking; real-time analytics in a live operation (to adjust operation on the fly) and actionable analytics and visibility on achievable schedule commitments.

In a further embodiment, the system may include aircraft position detection equipment. Aircraft position on the taxiways, de-icing pad and bays can be transmitted to the system from aircraft satellite tracking systems in order to provide positioning data for the system. In addition, the architecture of the system of the disclosure may receive aircraft position from external systems. In a preferred embodiment, the aircraft position detection equipment includes a Smart Tower. In this embodiment, the system allows individuals to view de-icing facilities from a remote or off-site location. In conjunction with the system of the disclosure, the de-icing facility can be viewed and controlled from the remote or off-site location.

Figure 9:
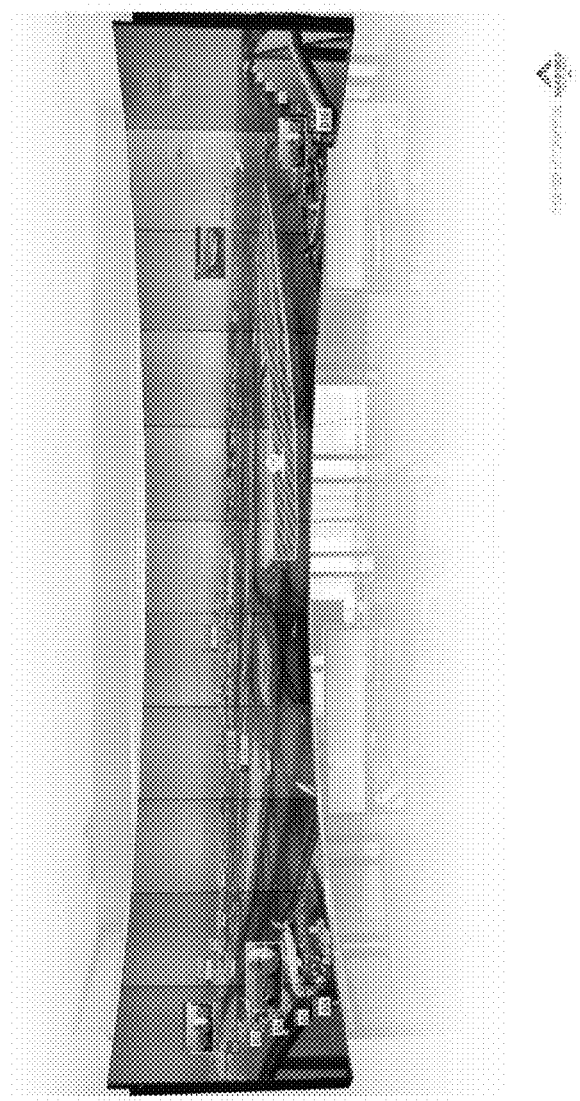
FIG. 9 is a panoramic view provided by a system for aircraft de-icing scheduling and guidance.

As schematically shown in FIG. 9, information or data from the cameras may be stitched together to create a panoramic view of the facility.

In one embodiment, information from the Smart Tower may be processed by the system to include geo-tagging and/or information tagging of aircraft and de-icing vehicles. De-icing vehicles may be seen as vehicles that may travel to positions where aircraft are located in order to perform de-icing or vehicles that move around a de-icing facility in order to de-ice an aircraft. The processing of the tower information to include geo-tagging and/or other tagging information is an improvement over current systems. The system may also use this geo-tagging information to provide safety measures during the de-icing process. For instance, by using the geo-tagging information, aircraft incursions zones may be generated so that if the aircraft enters an incursion zone, messages are transmitted to the aircraft to stop or to warn the aircraft of possible danger. This information may also be displayed to a user (such as via the screens shown in FIGS. 5b and 5d).

A further advantage of the current system is that the system allows processing of aircraft and de-icing vehicle such that all aircraft and de-icing equipment or vehicles are tagged with identifiers. In a preferred embodiment, the de-icing equipment may provide additional information such as, but not limited to, displaying fluid levels and other de-icing information. Another advantage of the system of the disclosure is the provision of aircraft incursion safety zones that are displayed around aircraft, indicating (alarming, annunciating) zones where vehicles or static equipment may contact aircraft surfaces. Another advantage of the system is that if an aircraft is sensed to have entered an incursion zone, the system may generate warning messages on the EMBs and/or not allow an operator of the system to let the aircraft make any further movements.

The system may also include video tagging identifying de-icing vehicles and aircraft on the ground; an view of de-icing vehicle informatics such as alarms and fluid levels; an overlay of aircraft incursion zones on the operator display; safety systems that notify operators, such as those controlling a de-icing vehicle remotely, that their de-icing vehicles are near aircraft; safety systems that reduce the risk of aircraft movement when incursions are detected.

Figure 10:
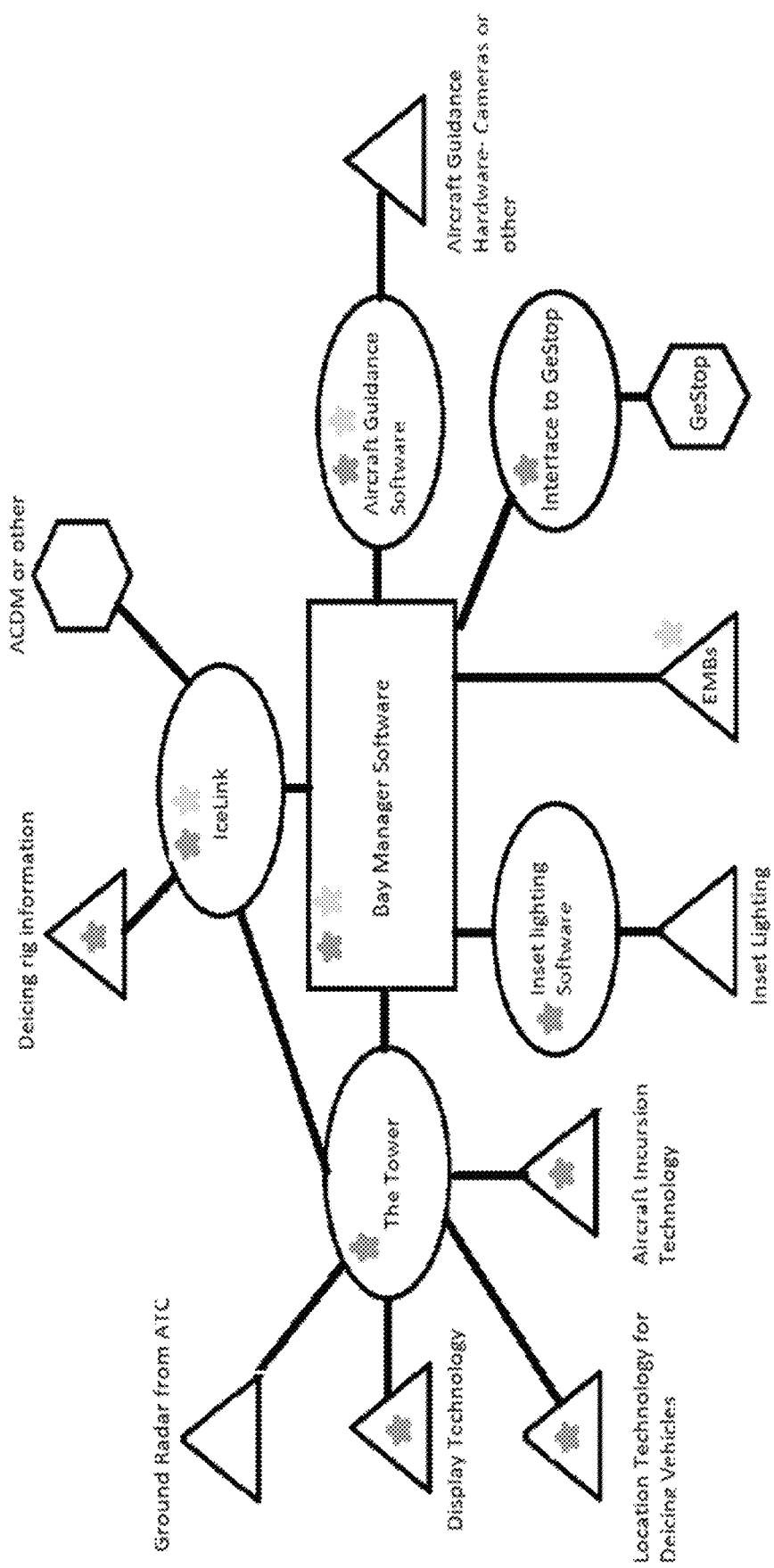
FIG. 10 is a schematic diagram of another embodiment for a system for aircraft de-icing scheduling and guidance.

A schematic diagram of another embodiment of a system for controlling a de-icing procedure is shown in FIG. 10.

The system may further include safety zone lighting. As each de-icing bay has zones dedicated to safe parking of large de-icing trucks. These safe zones reduce the likelihood that that aircraft and de-icing trucks damage each other. The trucks take up these positions when aircraft are in motion or are about to move. This may also be seen as position optimization.

Safe zones are preferably designated by specific lights and paint schemes. The system may provide mechanisms to turn on and off the bays safe zone light, to announce to the de-icers that aircraft are moving or are about to move and where to park the de-icing trucks.

The capability of clearly designating safe zones is especially important when a de-icing facility has composite bays. Composite bays are used to de-ice a single large aircraft or simultaneous de-icing of smaller aircraft.

Utilizing the aircraft class (size), and the configuration of the composite bay, the system may automatically configure the lead in and out taxiway lights and/or safety zone lighting.

In a preferred embodiment, the lighting around the perimeter of the safe zones clearly identify the location of the safe zones in all weather. In another embodiment, the safe zone lighting is part of the configurator of various requirements of a de-icing pad facility.

In one embodiment, the configurable lighting orientations allow the de-icing pad to be orientated as per their requirements controlled by specific and graphically representative icons and displays of active and inactive equipment (lighting, trucks, and aircraft on the client interface). Also, the dedicated control of each lighting strand (per de-icing bay within the pad) allows for the operator to have positive control of the aircraft. Also, the system may include a way to automatically trigger functions through either multilateration equipment that is either ground based or satellite based which identifies the proximity of the aircraft position and commands the aircraft through lighting and or Signboards (EMBs) to safe position in the ingress and egress of the de-icing process in a CDF or a stand, area, bay etc . . . In a further embodiment, the system may include functionality to generate and automate performance reports with real time information and management of any operation which provides the platform of the ability to remote manage it.

In the preceding description, for purposes of explanation, numerous details are set forth in order to provide a thorough understanding of the embodiments. However, it will be apparent to one skilled in the art that other arrangements and embodiments would be feasible.

The above-described embodiments are intended to be examples only. Alterations, modifications and variations can be effected to the particular embodiments by those of skill in the art without departing from the scope of the application, which is defined solely by the claims appended hereto.

What is claimed is:

1. A method of facilitating de-icing for an aircraft comprising:
   placing the aircraft in an inbound queue;
   determining a location for de-icing of the aircraft;
   illuminating directional lights to guide the aircraft to the location; and
   using positioning technologies to slow and stop the aircraft at the location within a safety zone for de-icing of the aircraft,
   wherein illuminating directional lights to guide the aircraft to the location includes:
      determining aircraft type;
      generating the safety zone based on the aircraft type; and
      guiding the aircraft to the location based on the aircraft type and the safety zone.

2. The method of claim 1 wherein determining the location comprises:
   processing aircraft characteristics; and
   selecting a location for de-icing based on the aircraft characteristics.

3. The method of claim 2 wherein aircraft characteristics comprise:
   size of aircraft, takeoff runway of aircraft and current location of aircraft.

4. The method of claim 1 wherein illuminating directional lights to guide the aircraft comprises:
   transmitting aircraft positioning messages to the aircraft via electronic message boards.

5. The method of claim 4 wherein illuminating directional lights to guide the aircraft further comprises:
   illuminating ground lights to generate a lighted path for the aircraft.

6. The method of claim 1 wherein illuminating directional lights to guide the aircraft comprises:
   illuminating ground lights to generate a lighted path for the aircraft.

7. The method of claim 1 wherein illuminating directional lights to guide the aircraft comprises:
   determining an aircraft position of the aircraft;
   determining a de-icing position of a de-icing bay; and
   determining a path from the aircraft position to the de-icing position.

8. The method of claim 7 wherein determining the aircraft position comprising:
   using sensor equipment, cameras, MLATs or location devices on the aircraft to determine the aircraft position.

9. The method of claim 1 further comprising:
   monitoring the safety zone to ensure no obstacles in the aircraft's travel path when guiding the aircraft.

10. The method of claim 1 wherein illuminating directional lights to guide the aircraft comprises:
    determining an aircraft position of the aircraft; and
    activating and deactivating directional lights based on the aircraft position.

11. The method of claim 10, wherein determining an aircraft position of the aircraft includes determining the aircraft position when the aircraft was placed in the inbound queue.

12. The method of claim 1, further comprising illuminating directional lights to guide the aircraft from the location.

13. The method of claim 1 wherein using positioning techniques comprises:
    determining safety zones within the location for de-icing of the aircraft; and
    positioning the aircraft based on the safety zones.

14. The method of claim 13 further comprising:
    geo-tagging the aircraft to assist in positioning the aircraft at the location for de-icing of the aircraft.

15. The method of claim 1 wherein using positioning techniques comprises:
    using an illuminated stop bar to assist a pilot in positioning the aircraft.

16. A method of facilitating de-icing for an aircraft comprising:
    placing the aircraft in an inbound queue;
    determining a location for de-icing of the aircraft;
    illuminating directional lights to guide the aircraft to the location; and
    using positioning technologies to slow and stop the aircraft at the location in accordance with configured safe zones for de-icing vehicles,
    wherein illuminating directional lights to guide the aircraft to the location includes:
       determining aircraft type;
       generating the safe zones based on the aircraft type; and
       guiding the aircraft to the location based on the aircraft type and the safe zones.

* * * * *